United States Patent
Kikin-Gil et al.

(10) Patent No.: US 11,514,893 B2
(45) Date of Patent: Nov. 29, 2022

(54) VOICE CONTEXT-AWARE CONTENT MANIPULATION

(71) Applicant: Microsoft Technology Licensing, LLC

(72) Inventors: Erez Kikin-Gil, Bellevue, WA (US); Emily Tran, Seattle, WA (US); Benjamin David Smith, Woodinville, WA (US); Alan Liu, Seattle, WA (US); Erik Thomas Oveson, Renton, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 179 days.

(21) Appl. No.: 16/818,414

(22) Filed: Mar. 13, 2020

(65) Prior Publication Data

US 2021/0233522 A1 Jul. 29, 2021

Related U.S. Application Data

(60) Provisional application No. 62/967,352, filed on Jan. 29, 2020.

(51) Int. Cl.
*G10L 15/18* (2013.01)
*G10L 15/22* (2006.01)
*G06N 20/00* (2019.01)
*G10L 15/183* (2013.01)

(52) U.S. Cl.
CPC .......... *G10L 15/1815* (2013.01); *G06N 20/00* (2019.01); *G10L 15/183* (2013.01); *G10L 15/22* (2013.01); *G10L 2015/223* (2013.01)

(58) Field of Classification Search
CPC ... G10L 15/1815; G10L 15/22; G10L 15/183; G10L 2015/223; G06N 20/00
See application file for complete search history.

(56) References Cited

U.S. PATENT DOCUMENTS 9,495,955 B1 * 11/2016 Weber .................. G10L 15/063
10,235,130 B2    3/2019 Bai et al.
2009/0150156 A1 * 6/2009 Kennewick ............. G10L 15/00
                                                    704/257
2015/0161984 A1   6/2015 Vanblon et al.
(Continued)

FOREIGN PATENT DOCUMENTS

WO    2019017984 A1    1/2019

OTHER PUBLICATIONS

"International Search Report and Written Opinion Issued in PCT Application No. PCT/US20/065000", dated Mar. 4, 2021, 15 Pages.

*Primary Examiner* — Bhavesh M Mehta
*Assistant Examiner* — Darioush Agahi
(74) *Attorney, Agent, or Firm* — NovoTechIP International PLLC

(57) ABSTRACT

Techniques performed by a data processing system for processing voice content received from a user herein include receiving a first audio input from a user comprising spoken content, analyzing the first audio input using one or more natural language processing models to produce a first textual output comprising a textual representation of the first audio input, analyzing the first textual output using one or more machine learning models to determine first context information of the first textual output, and processing the first textual output in the application based on the first context information.

20 Claims, 14 Drawing Sheets

(56) References Cited

U.S. PATENT DOCUMENTS

| | | |
|---|---|---|
| 2017/0125015 A1 | 5/2017 | Dielmann et al. |
| 2017/0263248 A1* | 9/2017 | Gruber .................. G06F 40/166 |
| 2018/0315415 A1 | 11/2018 | Mosley et al. |
| 2019/0318010 A1 | 10/2019 | Tamir et al. |
| 2020/0173788 A1* | 6/2020 | Liu ........................ G01C 21/32 |
| 2021/0150585 A1* | 5/2021 | Sarkhel .................. G06N 20/00 |
| 2021/0201238 A1* | 7/2021 | Sekar .................. G06Q 30/016 |

* cited by examiner

Order of Operations for Formatting-Based Voice Command Chaining

Use existing formatting to create an algorithm for an order-of-operations to apply formatting updates.

Voice command: "remove underline and bold"

<u>The quick fox jumped.</u>
remove (underline and bold)
The quick fox jumped.

<u>The quick fox jumped.</u>
(remove underline) and bold
The quick fox jumped.

FIG. 13

VOICE CONTEXT-AWARE CONTENT MANIPULATION

CROSS-REFERENCE TO RELATED APPLICATION

This application claims the benefit of priority to U.S. Provisional Patent Application No. 62/967,352, filed on Jan. 29, 2020 and entitled "Voice Context-Aware Content Manipulation," the entirety of which is incorporated by reference herein in its entirety.

BACKGROUND

Voice input for computing devices provides user with a means for dictating textual content and/or entering commands to control operations of the computing device. Current voice inputs solutions often have difficulties determining whether a voice input includes textual content, voice commands, or both. The user experience is diminished when, for example, commands are mistakenly interpreted as textual input, or textual input is mistaken for a command, causing the computing device to perform an undesired operation. Thus, there are significant areas for new and approved mechanisms for voice-based content manipulation.

SUMMARY

An example data processing system according to the disclosure may include a processor and a computer-readable medium storing executable instructions. The executable instructions include instructions configured to cause the processor to perform operations including receiving a first audio input from a user comprising spoken content; analyzing the first audio input using one or more natural language processing models to produce a first textual output comprising a textual representation of the first audio input; analyzing the first textual output using one or more machine learning models to determine first context information of the first textual output; and processing the first textual output in the application based on the first context information.

An example method performed by a data processing system for processing voice content received from a user includes: receiving a first audio input from a user comprising spoken content; analyzing the first audio input using one or more natural language processing models to produce a first textual output comprising a textual representation of the first audio input; analyzing the first textual output using one or more machine learning models to determine first context information of the first textual output; and processing the first textual output in the application based on the first context information.

An example memory device according to the disclosure stores instructions that, when executed on a processor of a data processing system, cause the data processing system to process voice content received from a user, by: receiving a first audio input from a user comprising spoken content; analyzing the first audio input using one or more natural language processing models to produce a first textual output comprising a textual representation of the first audio input; analyzing the first textual output using one or more machine learning models to determine first context information of the first textual output; and processing the first textual output in the application based on the first context information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 13 illustrates another example of voice-command chaining that may be implemented by the contextual language processing unit of FIGS. 1A and 1B.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for improved voice-based content manipulation are provided herein that use context to enable improved interpretation of voice inputs. The techniques disclosed herein provide a technical solution to the technical problem of differentiating between textual content and commands in voice-based content manipulation scenarios. The techniques disclosed herein utilize one or more natural language processing models to analyze audio inputs received from the user and translate these audio inputs into textual outputs. The audio inputs may include textual content, one or more commands to be performed by an application on the textual content, or a combination thereof. The natural language processing models are trained to accurately recognize the words spoken in the audio input and to translate those words into textual output that represents what the user said. The techniques analyze the textual output of the natural language processing models to determine the context of what was said by the user. The first context information of the first textual output provides an indication of whether the first textual output includes the command and an indication of how the user intended to apply the command to content in an application utilizing these techniques. Additional context information may be obtained from the application that may be used to disambiguate the meaning of what was said by the user. The additional context information may include cursor or insertion point (IP) location information and/or other information that indicates how the user was interacting with the application prior to, during, or after issuing a voice command. A technical benefit of the techniques disclosed herein is that the accuracy of the handling of the voice inputs can be significantly improved by anticipating the intent of the user by analyzing the voice inputs using machine learning models trained to recognize numerous ways in which users may interact with the application.

Figure 1A:
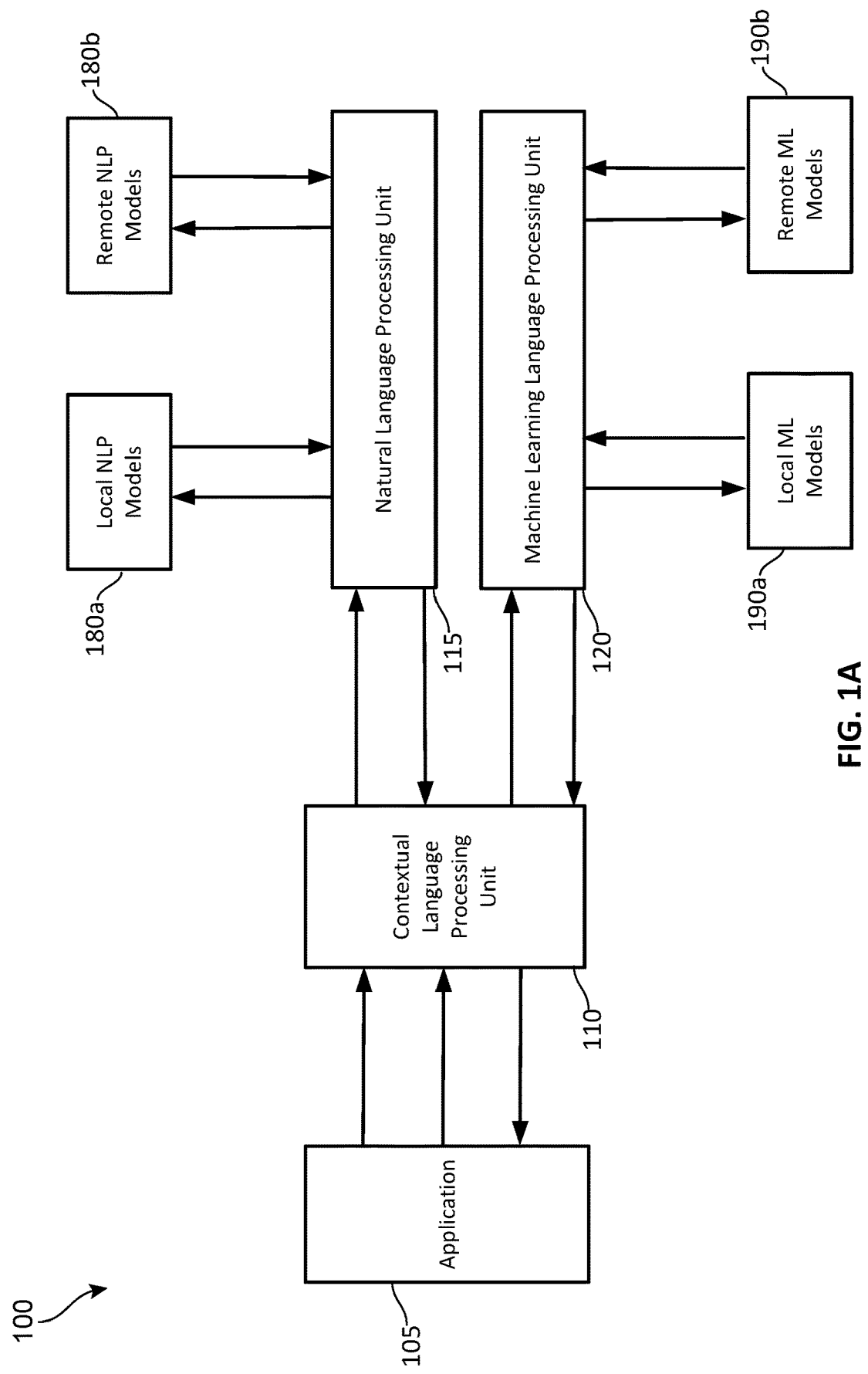
FIG. 1A is a block diagram illustrating an example computing environment in which the techniques disclosed herein may be implemented.
Figure 1B:
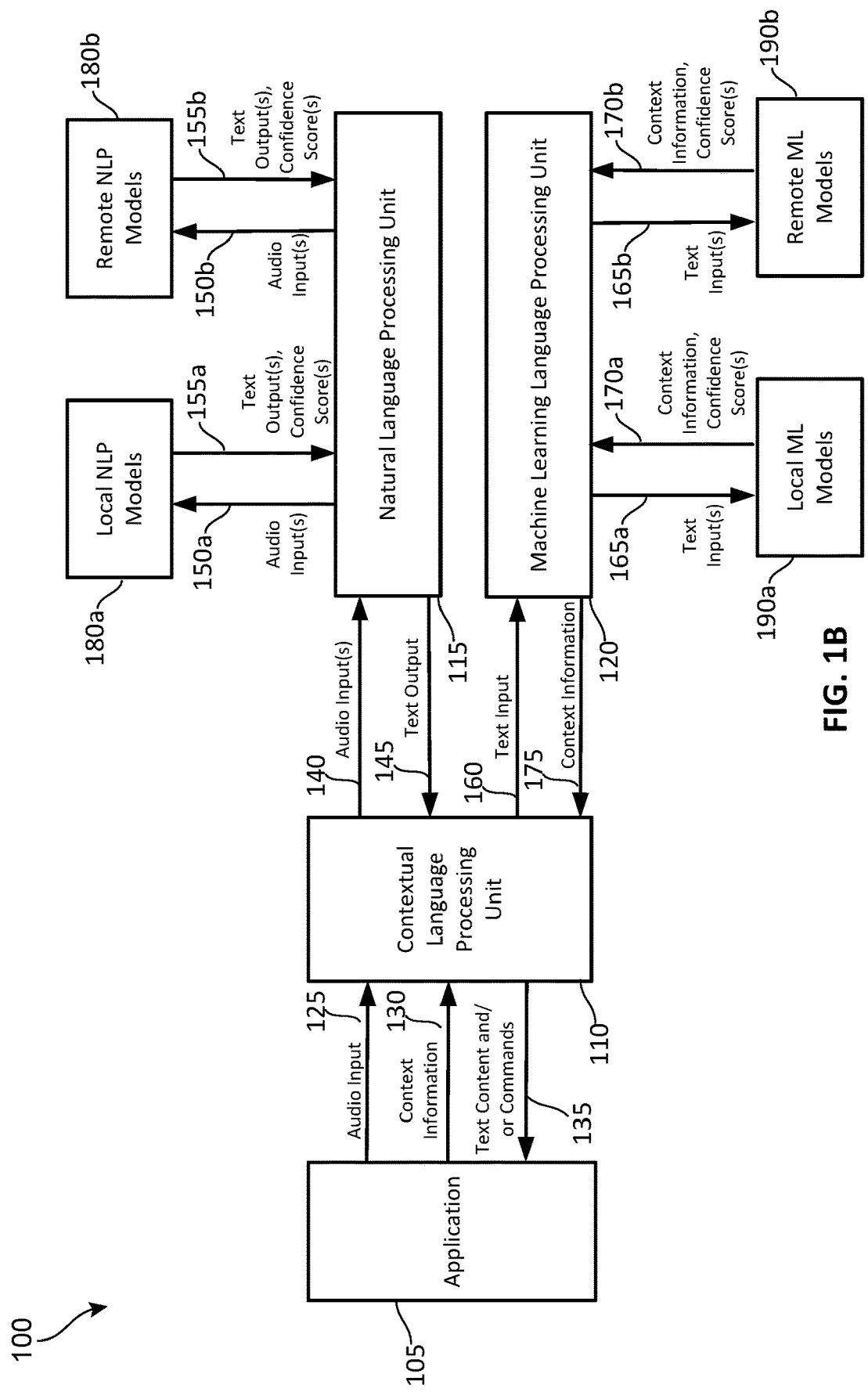
FIG. 1B is a block diagram illustrating additional details of the example computing environment illustrated in FIG. 1A.

FIG. 1A is a block diagram illustrating an example computing environment 100 in which the techniques disclosed herein may be implemented, and FIG. 1B is another block diagram of the example computing environment which illustrates example data which may be exchanged between the various components illustrated in the computing environment 100. The computing environment 100 includes an application 105, a contextual language processing unit (CLPU) 110, a natural language processing unit (NLPU) 115, a machine learning language processing unit (MLPU) 120, one or more local natural language processing (NLP) models 180a, one or more remote NLP models 180b, one or more local machine learning (ML) models 190a, and one or more remote ML models 190b. In some implementations, the functionality of the one or more of the natural language processing unit 115, the machine learning language processing unit 120, the one or more local NLP models 180a, and the one or more NLP models 180b may be implemented by the contextual language unit 110. Furthermore, in yet other implementations, at least a portion of the functionality of the contextual language processing unit may be implemented by the application 105.

The application 105 may be configured to receive textual input and/or commands through voice input. The application 105 may be a word processing application, an email application, a spreadsheet application, a messaging application, a presentation application, or other type of application that may be configured to receive voice inputs that may include textual input, commands, or both.

The application 105 may be implemented on various types of computing devices, such as but not limited to a personal computer (PC), a tablet computer, a laptop computer, a netbook, a gaming and/or entertainment system, a smart phone, a mobile device, or a wearable device. The application 105 may be implemented as executable program code implemented on the computing device or may be implemented as a cloud-based application that may be implemented at least in part on one or more remote servers, such as the cloud-based applications 235 of FIG. 2, and may be accessed through a web-browser or other such interface on the computing device 105.

The CLPU 110 may utilize the natural language processing unit 115 to provide speech recognition services for converting spoken language content included in an audio sample to text. The CLPU 110 may utilize the MLLPU 120 to determine a context for the text and to disambiguate the meaning of the text. The CLPU 110 is configured to obtain an audio input captured by a microphone or microphones associated with the computing device on which the application 105 is being executed and to process that audio input to identify content included in the audio input. The content may include textual input to be processed by the application 105, commands to be executed by the application 105, and/or both. The textual input may, for example, be textual content being dictated by the user for inclusion in a document being edited using the application 105. The commands may be related to editing and/or formatting textual input. For example, the user may state "bold the previous word" or "underline that" to render a word of the textual content in a bold font or to underline the word. Other types of formatting commands may be presented by the user in a voice command. The specific types of formatting commands recognized and supported by the application 105 depend upon the capabilities of the application 105 may be vary from application to application. The content may also include may be related to controlling the operation of one or more features of the application 105. For example, the user may state "save and close document" or "open new document" to save a document currently being worked on by the user and to open a new document, respectively. These examples are intended to illustrate how a user may utilize voice inputs to provide textual content and/or commands to an application 105 but do not limit the techniques disclosed herein to these specific examples. Additional use cases are illustrated in the examples that follow.

The NLPU 115 may be configured to use one or more speech models for converting an audio signal received by the application 105 into textual content representing the spoken content included in the audio signal. In the context of this application, the audio input being "received by the application" refers to an audio input being captured by one or more microphones associated with the computing device on which the application 105 is being executed. The audio signals may be provided as input to the application 105, which may in turn provide all or a portion of the audio input to the CLPU 110.

The NLPU 115 may process the audio content with more than model and compare the outputs of the models to determine the text to output by NLPU 115. The NLPU 115 may be configured to include one or more local NLP models 180a that are implemented locally on the computing device on which the application 105 is being executed, one or more remote NLP models 180b provided by a remote server, or both. The one or more remote NLP models 180*b* may be implemented on one or more remote servers that are accessible via a network connection. In some implementations, the audio input that includes spoken content may be streamed from the user's computing device to a cloud-based service for speech recognition, such as the speech processing cloud services 225 illustrated in FIG. 2 and described in detail in the examples that follow. Text output and/or other information from the cloud-based service may be transmitted back to the computing device via the network connection. The one or more local NLP models 180*a* may be built into the application 105 and/or an operating system of the computing device on which the application 105 is being executed. In some implementations, a user may configure the NLPU 115 to utilize one or more custom NLP models provided by a user of the computing device.

Each NLP model may associate a confidence score with the textual output generated by the model. The NLPU 115 may select an output from among the outputs generated by the models used by the NLPU 115 as the text output of the NLPU 115. This approach allows the CLPU 110 to decouple speech recognition from natural language understanding. The CLPU 110 can use various speech recognition engines to convert speech to text, and the resulting textual output can be provided to the machine learning language processing unit 120 for natural language understanding.

The MLLPU 120 is configured to receive the text output by the NLPU 115 and other contextual information associated with the application 105 to determine a contextual meaning for the text output by the NLPU 115. The natural language processing techniques employed by the NLPU 115 may provide extremely accurate speech to text services, but without an understanding of the contextual meaning of the text the application 105 may incorrectly interpret the textual output of the NLPU 115. For example, the textual output of the NLPU 115 may include textual content for the application 105, commands to be executed by the application 105, or a combination thereof. Without a contextual understanding of the textual output of the NLPU 115, textual content may be incorrectly interpreted as a command or vice versa. Furthermore, even if a command is recognized as a command, the intent of the user with regard to the command may be unclear. Suppose, for example, that the user recites the sentence "machine learning is interesting" followed by the command "bold that." The intent of the user is not clear based on the text alone. The user may intend to have the entire sentence rendered in bold font or the last word "interesting" rendered in bold font. Alternatively, the phrase "bold that" may not have been a command at all but instead may be the start of a new sentence of textual content. The NLPU 115 does not need to understand the underlying meaning or context of the text, the NPLU 115 just needs to provide an accurate transcription of the spoken input into text that may be analyzed by the MLPPU 120 for context.

The MLLPU 120 is configured to analyze the text generated by the NLPU 115 using one or more machine learning models, such as the one or more local ML models 190*a* and one or more remote ML models 190*b*, to provide a contextual understand of how the words are being used in the text output by the NPLU 115. The examples that follow illustrate the how the MLLPU 120 may be used to provide contextual understanding of the textual content, including interpretation of ambiguous command language included therein.

The MLLPU 120 may be configured to provide a context-sensitive understanding of commands included in the textual input. Suppose the user utters the phrase "bold that" as a command. What the word "that" refers to is ambiguous without additional context. The word "that" may be referring to rendering a last word or last phrase entered as bold or may be referring to a selected section of textual content. The MLLPU 120 may process the text and contextual information provided by the application 105 to determine a meaning for "that" as used in the command. The contextual information provided by the application 105 may include information indicative of how the user was interacting with the application 105 when the command "bold that" was spoken. The contextual information may include an indication that user has selected a section of text content in the application. The MLLPU 120 may determine that the selected content was intended to be rendered in bold text in this context. The contextual information may also include a position of a cursor or insertion point (IP) in the document being edited at the time that the command was spoken. The context information may include an indication of the type of application being used by the user, and what type of content was being edited by the user at the time that the command was spoken. For example, if the IP indicates was positioned in a header of the document at the time that the phrase "bold that" was spoken, the MLLPU 120 may interpret this command to indicate that the entire header should be bolded based on a machine learning model used by the MLLPU 120 having been trained to understand that headers of the particular type of document being worked on by the user are typically emphasized using bold and/or underlined text. Other contextual information may be provided by the application 105 which may be used to disambiguate the meaning of the input text.

The machine learning models used by the MLLPU 120 can also incorporate culture-specific and domain-specific understanding of the textual inputs. For example, different models may be used for different geographical regions and/or languages which may have different sentence structure and grammatical rules. Region or culture specific may models may be used for different English or Spanish speaking regions of the world. For example, different models may be used for British English versus North American English. The models may be even more fine grained and support various dialects of English, that may include vocabulary, grammatical rules, and/or slang that is specific to those dialects, such as but not limited to American English, Canadian English, Scottish English, Irish English, and/or other regional dialects of the English language. Similarly, different models may be provided for Peninsular Spanish (European Spanish) versus New World Spanish dialects. Again, fine-grained models may support various dialects of Spanish that may include vocabulary, grammatical rules, and/or slang that is specific to those dialects, such as but not limited to Chilean Spanish, Mexican Spanish, and Andalusian Spanish. Other models may be configured to support other languages and/or dialects thereof. The context information provided by the application 105 may include region information indicative of a geographical location in which the computing device is located, a language selected by the user, and/or other information that can be used to determine a model that may be used to determine a context of the input from the NLPU 115.

The MLLPU 120 may be configured to provide a context-sensitive understanding of textual inputs to determine whether a part of an audio input is intended to be textual content or intended to be a command acted upon by the application 105 in a context-sensitive manner. For example, the text output by the NPLU 115 may include "This is great! Italicize the last word." Ideally, the first half of the text, which includes the text "This is great!", should be interpreted as text content, while the second half of the text input should be interpreted as a command, which includes the text "Italicize the last word." The machine learning models used by the MLLPU 120 can be trained to identify a set of commands words or phrases that may typically be spoken by a user of the application 105. The machine learning models may be trained to identify a different set of commands for different types of applications, such as but not limited a web browser versus a messaging application. The machine learning models may be trained to identify specific sets of commands for specific applications.

The MLLPU 120 may be configured to provide a context-sensitive understanding of textual inputs to disambiguate phrases that sound similar and may be misinterpreted by the NPLU 115. For example, the command "insert table" sounds very much like the word "insertable" which may be included in textual input spoken by the user. The natural language models used by the NPLU 115 may or may not accurately determine whether utterance was meant to be a command or was meant to be a word included in the text. However, the machine learning models used by the MLLPU 120 may be trained to identify ambiguous words or phrases in included in the text output by the NLPU 115 and may make a determination whether the user intended to issue the command "insert table" or merely to include the word "insertable" in the textual content provided to the application 105. The MLLPU 120 may use the context information provided by the application 105 in addition to the text provided by the NPLU 115 to make a determination what the user intended to say and whether that utterance was a command or textual content. The machine learning model(s) used by the MLLPU 120 may look at the text before and/or after the utterance when determining the context. For example, the user may use the word "insertable" in a sentence with certain words, such as "insertable into" which may indicate that user intended to use the word "insertable" rather than issue the command "insert table." The machine learning model(s) may take into account the type of application being used by the user when disambiguating between multiple possible utterances. For example, the model may determine that the command "insert table" was more probable where the user is working in a spreadsheet application and is less likely if the user is working in a messaging application. These examples are intended to illustrate on example in which the machine learning model(s) of the MLLPU 120 may be used to resolve ambiguities in the language uttered by the user and do not limit the models to these specific examples.

The MLLPU 120 may be configured to trigger a disambiguation process in some implementations. The MLLPU 120 may be configured to trigger a disambiguation process in response to the model(s) used by the MLLPU 120 outputting multiple possible outputs where the MLLPU 120 is unable to distinguish between the outputs. The model(s) may have assigned similar confidence score or none of the outputs may have been assigned a high enough confidence score to make a decision. The MLLPU 120 or the CLPU 110 may be configured to render a user interface on the computing device of the user to present a list of choices to the user from which the user may select what was actually said by the user. The user interface may also include an option where the user may select enter text indicating what was actually said by the user if the list of options presented by the MLLPU 120 or the CLPU 110 is incorrect. In some implementations, if the user utterance is determined to be a command, the MLLPU 120 or the CLPU 110 may provide suggestions that more clearly articulate the command user was trying to say once the input has been disambiguated.

The MLLPU 120 may be configured to identify unimplemented commands based on user utterances and observed multi-modal actions. For example, the MLLPU 120 may obtain keyboard and/or mouse interactions with the application 105 with the context information received from the application 105. The MLLPU 120 may analyze the user utterances and interactions with the user interface of the application 105 to identify additional commands that may not yet be supported by the MLLPU 120 but the model(s) used by the MLLPU 120 could be trained to support voice commands for such utterances. This information may be crowdsourced across users by reporting such unsupported utterances to a cloud-based service associated with the MLLPU 120. For example, if more than a threshold number of users utter the command "watermark" and then perform a series of mouse and/or keyboard commands to execute the watermark functionality when the user realizes that the voice command is not supported, then the model(s) used by the MLLPU 120 may be trained to recognize "watermark" as a command rather than just textual content. In implementations where the MLLPU 120 utilized one or more models stored locally on the user device, the NLPU 110 may receive updates to the local model(s) from the cloud-based service to update the model(s) used by the MLLPU 120 to support commands added through crowdsourcing.

FIG. 1B is a block diagram illustrating additional details of the example computing environment illustrated in FIG. 1A. The example illustrated in FIG. 1B illustrates the data elements that are passed among the various components of the computing environment 100.

The application 105 may capture an audio input 125 from a user. The audio input 125 may be captured using a microphone of the user's computing device. The audio input 125 may include spoken content that includes a command, textual content, or both. The application 125 may provide the audio input 125 and context information 130 to the CLPU 110. The context information 130 may include additional information identifying the application 105, regional information and/or language information identifying a language and/or dialect that may be spoken by the user, and/or other information that may be provided by the application that may be used to disambiguate the meaning of the spoken content. The application 105 may obtain at least a portion of the context information from an operating system of the computing device. The context information 130 may include cursor or insertion point (IP) location information and/or other information that indicates how the user was interacting with the application prior to, during, or after issuing a voice command. The cursor or IP location information may be used to disambiguate how the command is to be applied to textual content being dictated and/or revised by the user.

The CLPU 110 receives the audio input 125 and the optional context information 130 from the application 105. The CLPU 110 may output audio input(s) 140 to the NLPU 115. The NLPU 115 is configured to convert the spoken language included in the audio input(s) 140 to textual content. The audio input(s) 140 may be the same as the audio input 125 or the CLPU 110 may process the audio input 125 to generate the audio input(s) 140 for one or more natural language processing modules associated with the NLPU 115. For example, the CLPU 110 may preprocess the audio input 125 to filter out background noise, to convert the audio input 125 to a format that may be processed by one or more natural language processing models utilized by the NPLU 115, and/or other processing of the audio signal that may facilitate the one or more natural language processing models recognition of spoken content in the audio input 125. The CLPU 110 may output more than one audio input 140 for the NPLU 115 for use by one or more natural language processing models.

The NPLU 115 may be associated with one or more local natural language processing (NLP) models 180a, one or more remote NLP models 180b, or both. The local NLP models 180a may be implemented on the user's computing device, such as the user device 205 depicted in FIG. 2. The remote NLP models 180b may be implemented on one or more servers remote from the user's computing device that are accessible via one or more network connections. The remote NLP models 180b may be implemented by the speech processing cloud services 225 illustrated in FIG. 2 and discussed in detail in the examples the follow.

The NPLU 115 may be configured to provide the audio input(s) 150a to the local NLP models 180a and the audio input(s) 150b to the remote NLP models 180b. In some implementations, the NPLU 115 may preprocess the audio input(s) received from the CLPU 110 to filter out background noise, to convert the audio input(s) 140 to a format that may be processed by one or more local or remote natural language processing models utilized by the NPLU 115, and/or other processing of the audio signal that may facilitate the one or more natural language processing models recognition of spoken content in the audio input 140. Each NLP model used by the NLPU 115 may provide a textual output and a confidence score to the NPLU 115, such as the textual output(s) and confidence score(s) 155a from the local NLP models 180a and the textual output(s) and confidence score(s) 155b from the remote NLP models 180b. The textual output from each NLP model represents that particular model's interpretation of the spoken content included in the audio signal provided to the model. The NLP model may also output a confidence score that represents an estimated probability of correctness of the textual output by that model. The calculation of the confidence score is dependent upon the implementation of the NLP model. The NPLU 115 may be configured to select a textual output from one of the NLP models, where more than one NL model is used, to output as the text output 145. The NPLU 115 may select the textual output associated with the highest confidence score. In some implementations, the NPLU 115 may only use one remote or one local NLP model to generate the textual output. In such implementations, the NLPU 115 may output the textual output from that model without considering a confidence score associated with the textual output.

The CLPU 110 may provide the text output 145 as a text input 160 to the MLLPU 120. The MLLPU 120 may provide the text input 160 to one or more local machine learning (ML) models 190a and/or one or more remote ML models 190b. The one or more local ML models 190a may be implemented on the user's computing device, such as the user device 205 depicted in FIG. 2. The remote ML models 190b may be implemented on one or more servers remote from the user's computing device that are accessible via one or more network connections. The remote ML models 190b may be implemented by the speech processing cloud services 225 illustrated in FIG. 2 and discussed in detail in the examples the follow.

Each ML model may be configured to receive the text input 160 and optionally receive the context information 130 from the application 105. As discussed above, the context information 130 may include language and/or dialect information, location of the cursor or IP within the text of a document being edited using the application, and/or other information that may be used to determine the context of the textual content output by the NLPU 115. The context information may also include at least a portion of the textual content that has already included in the document being edited in the application 105. The textual content included with the context information may be used by the ML model(s) in situations where the spoken content included in the audio input includes a command but no text to which the command is to be applied. Each ML model may output context information and a confidence score associated with that confidence information.

The local ML models 190a may provide the context information and confidence score(s) 170a, and the remote ML models 190b may provide the context information and confidence score(s) 170b. The context information may include an indication of whether the textual input provided to the ML model included at least one command and information indicating how the user intended to apply that command to textual content included in the textual input and/or existing textual content that has already been added to the document being edited in the application 105. The confidence score represents an estimated probability of correctness of the context information output by that model.

The MLLPU 120 may select context information received from a plurality of ML models based on the confidence scores associated with the ML models. The MLLPU 120 may select context information that is associated with a highest confidence score and output that context information as context information 175 to the CLPU 110. The CLPU 110 may use the context information 175 to determine text content and/or commands 135 to be provided to the application 105. The text content includes textual content that was dictated by the user and includes in the audio input 125. The command information may include one or more commands to be performed on textual content by the application 105. The command information may identify which text on which each command is to be performed.

Figure 2:
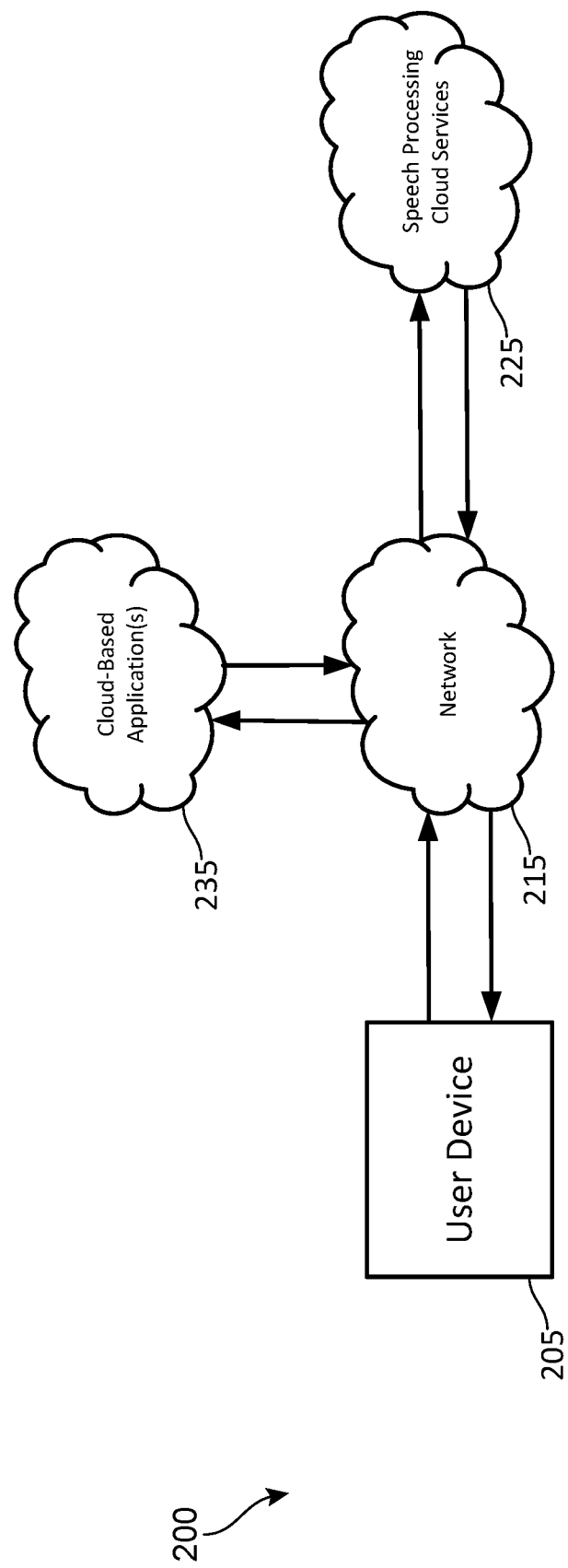
FIG. 2 illustrates a block diagram of an example computing environment in which the techniques disclosed herein may be implemented.

FIG. 2 illustrates a block diagram of an example computing environment 200 in which the techniques disclosed herein may be implemented. The application 105 may be implemented on the user device 205 or the application 105 may be implemented as a cloud-based application 235 that is accessible from a web browser or other similar interface on the user device 205. As discussed in the preceding examples, the user device 205 may be a personal computer (PC), a tablet computer, a laptop computer, a netbook, a gaming and/or entertainment system, a smart phone, a mobile device, a wearable device, or other type of computing device. The speech processing cloud services 225 may be configured to implement at least a portion of the CLPU 110 illustrated in FIGS. 1A and 1B. The CLPU 110 may be implemented on the user device 205 and/or on the speech processing cloud services 225. Furthermore, one or more models used by the NLPU 115 and/or the MLLPU 120 may be implemented by the speech processing cloud service 225 and/or on the user device 205.

Figure 3:
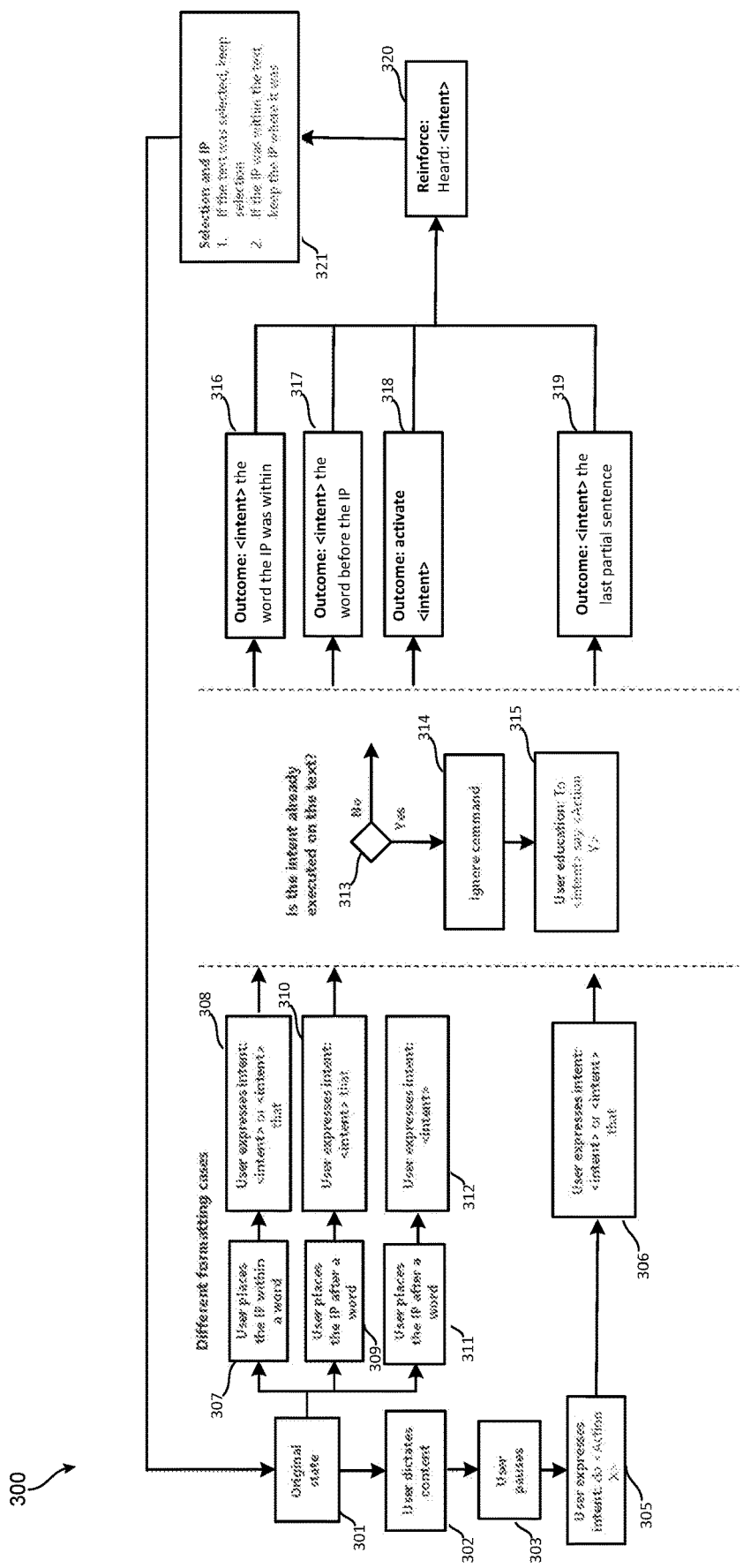
FIG. 3 is a flow diagram of an example process that may be implemented by the contextual language processing unit of FIGS. 1A and 1B.

FIG. 3 is a flow diagram of an example process 300 that may be implemented by the CLPU 110. In the example illustrated in FIG. 3, the command "bold" or "bold that" is detected in the audio input 125 received from the application 105. The process 300 starts with the application 105 being in an original state 301. The original state may include content, textual or otherwise, that has already added to a document by a current user or another user. In this example, the user dictates textual content 302, and then pauses at operation 303. The CLPU 110 may determine, based on the output of the MLLPU 120, that the textual content dictated by the user comprises textual content to be rendered by the application 105. The MLLPU 120 may detect the pause in the audio content at operation 303 and may make a determination that the pause is an indication that the user has completed the dictation of the textual content.

The user may then express an intent to perform a command in operation 305. The command may be uttered in a second utterance after the user pauses at operation 303. While the example illustrated in FIG. 3 includes a pause at operation 303, the techniques disclosed herein do not require a pause between the textual content dictated by the user in operation 302 and utterance of the command in operation 305. As discussed in the preceding examples, the audio input that includes the spoken content to be processed may include both textual content and one or more commands rather than separate inputs separated by a pause.

In operation 305, the user expresses the intent "do <ActionX>" by issuing a command instructing the application 105 to perform a specified action. In this example, the user issues the command "Bold" or "Bold that" indicating that the user would like to render text in bold font. The process 300 illustrates an example process that the CLPU 110 may perform to determine which textual content is being referred to by the user to be rendered in bold font. The CLPU 110 and/or the MLLPU 120 may determine that the second utterance is a command based on the pause in the user speech. The MLLPU 120 can use this information to infer that the user has expressed an intent to perform a command at operation 306. The process may continue with operation 313.

The operation illustrated in FIG. 3 may alternatively flow from the original state 301, to one of several operations in which the user sets the position of the cursor/IP before uttering a command. In a first example, the user places the cursor/IP within a word (operation 307) and then issues the voice command "bold that" (operation 308). In a second example, the user places the cursor/IP after a word (operation 309) and then issues the voice command "bold that" (operation 310). In a third example, the user places the cursor/IP after a word (operation 311) and issues the command "bold") (operation 312). The process may continue with operation 313 from operations 308, 310, or 312.

The process may continue with operation 313, in which a determination is made whether the intent has already been executed on the text. The command may be ignored at operation 314 if the intent has already been executed on the textual content. The MLLPU 120 and/or the CLPU 110 may then optionally provide user education or assistance based on the intent of the user inferred by the MLLPU 120 based on the textual input provided by the user and the contextual information received from the application 105. For example, the MLLPU 120 may display and/or use text-to-speech to provide audio feedback to the user providing alternative wording to more clearly express the command language and/or to provide guidance how to express another alternative command that the user may have intended to issue.

If the command was not already executed on the text, the process may continue with one of operations 316, 317, 318, or 319 depending upon the preceding operations. If operation 308 preceded operation 313, then the operation 316 may be executed, and the text of the word in which the cursor/IP was located is rendered in bold font. If the operation 310 preceded operation 313, then the operation 316 may be executed in which text of the word preceding the location of the cursor/IP was located is rendered in bold font. If the operation 312 preceded the operation 313, then the operation 318 may be executed and "bold" font style may be activated so that subsequent text which is added via dictation or by typing will be rendered in bold font. If the operation 306 preceded the operation 313, then the operation 319 may be executed and the last partial sentence dictated and/or typed by the user may be rendered in bold font.

The process may continue with the operation 320 in which the MLLPU 120 may confirm the behavior of the model used was correct to reinforce the behavior of the model. Reinforcing the behavior of the model may help improve the performance of the model. The specific means for reinforcing the behavior of the model depends upon the type of model(s) being used by the MLLPU 120. The operation 320 may be followed by operation 321 in which the following operations may be performed: (1) if the text was selected, keep the text selected after rendering in bold font, and (2) if the cursor/IP was within the text when the "bold" command was uttered by the user, then keep the cursor/IP at that same location.

Figure 4:
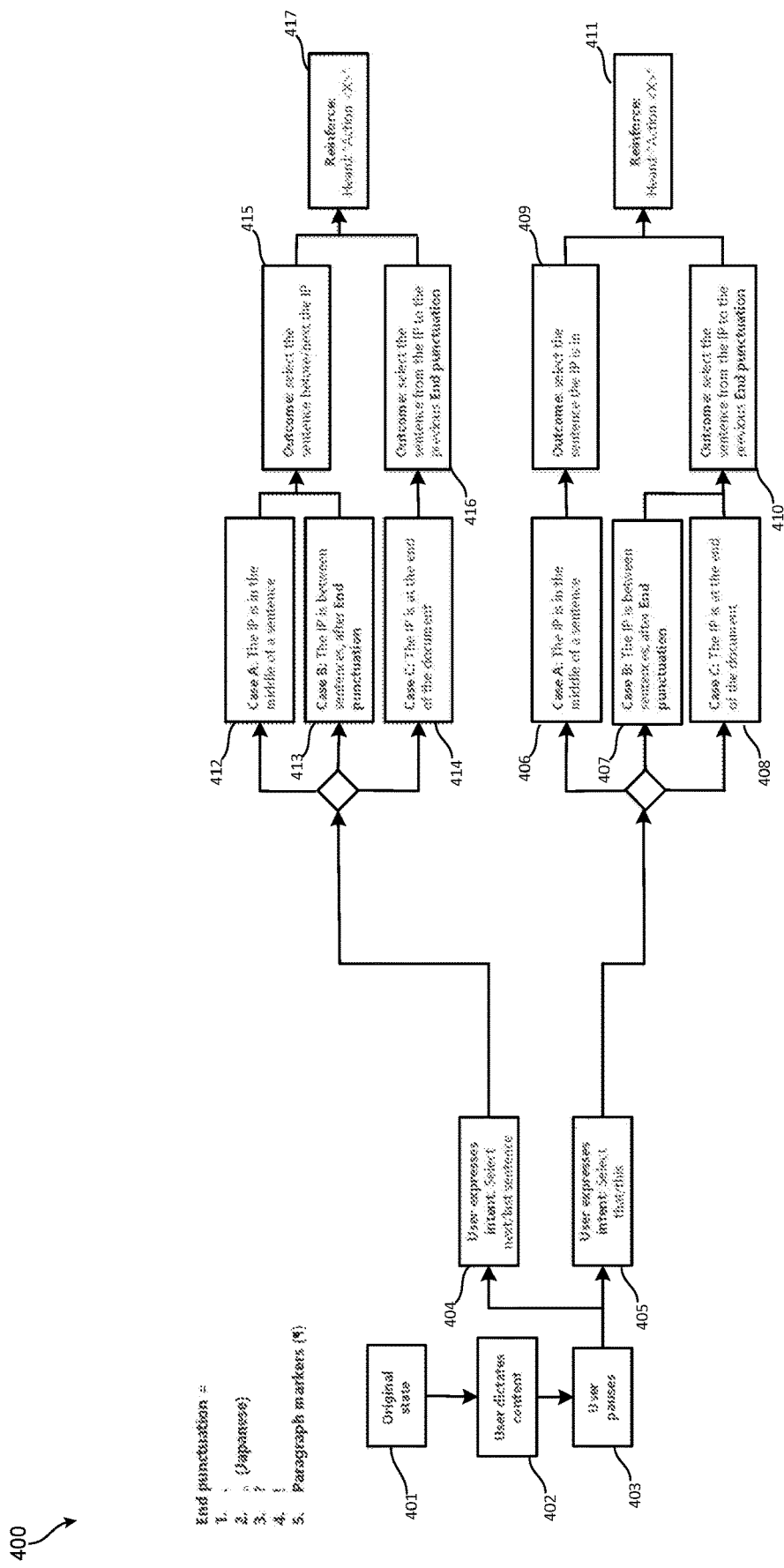
FIG. 4 is a flow diagram of another example process that may be implemented by the contextual language processing unit of FIGS. 1A and 1B.

FIG. 4 is a flow diagram of an example process 400 that may be implemented by the CLPU 110. In the example illustrated in FIG. 4, the command "select that" or "select last sentence" or "select next sentence" is detected in the audio input received from the application 105. The process 400 starts with the application 105 being in an original state 401. The original state may include content, textual or otherwise, that has already added to a document by a current user or another user. In this example, user dictation of textual content is detected in operation 402, and a pause in the user dictation is detected in operation 403. The CLPU 110 may determine, based on the output of the MLLPU 120, that the textual content dictated by the user comprises textual content to be rendered by the application 105. The MLLPU 120 may detect the pause in the audio content at operation 403 and may make a determination that the pause is an indication that the user has completed the dictation of the textual content.

The process 400 splits into two flows after operation 403: the user expresses "select this" or "select that" at operation 405 or the user expresses "select next sentence" or "select last sentence" at operation 404. As discussed in the preceding examples, operation 403 is optional. The techniques disclosed herein do not require a pause between the textual content dictated by the user in operation 402 and utterance of the command in operations 404 or 405. As discussed in the preceding examples, the audio input that includes the spoken content to be processed may include both textual content and one or more commands.

The process may then split into multiple flows following operation 404 based on the position of the cursor/IP at the time that command was issued by the user. In operation 412, the cursor/IP is determined to be in the middle of a sentence. In operation 413, the cursor/IP is determined to be located in between sentences and after final punctuation. Final punctuation is indicative of the end of a sentence. The final punctuation may be language specific. For example, a period is indicative of the end of the sentence in English, Spanish, and other languages, while a kuten or maru is used to indicate the end of a sentence in Japanese. Other types of indicators may also be used, such as a paragraph indicator in the document, which indicates that a new paragraph has begun in the text. In both of the preceding scenarios, the sentence before or following the cursor/IP or in which the cursor/IP is located will be selected dependent upon whether the user indicated that the "last" or the "next" sentence be selected in operation 415. In operation 414, the cursor/IP is determined to be located at the end of a document when the command is issued. In this scenario, any text located between the current location of the cursor/IP and the previous end punctuation is selected in operation 416. The process may continue with the operation 417 in which the MLLPU 120 may confirm the behavior of the model used was correct to reinforce the behavior of the model. As discussed in the preceding examples, reinforcing the behavior of the model may help improve the performance of the model. The specific means for reinforcing the behavior of the model depends upon the type of model(s) being used by the MLLPU 120.

The process may also split into multiple flows following operation 405 based on the position of the cursor/IP at the time that command was issued by the user. In operation 406, the cursor/IP is determined to be in the middle of a sentence. The sentence in which the cursor/IP is located will be selected in operation 409. In operation 407, the cursor/IP is determined to be located in between sentences and after final punctuation, and in operation 408, the cursor/IP is determined to be located at the end of a document when the command is issued. In either of these two scenarios, any text located between the current location of the cursor/IP and the previous end punctuation is selected in operation 410. The process may continue with the operation 411 in which the MLLPU 120 may confirm the behavior of the model used was correct to reinforce the behavior of the model.

Figure 5:
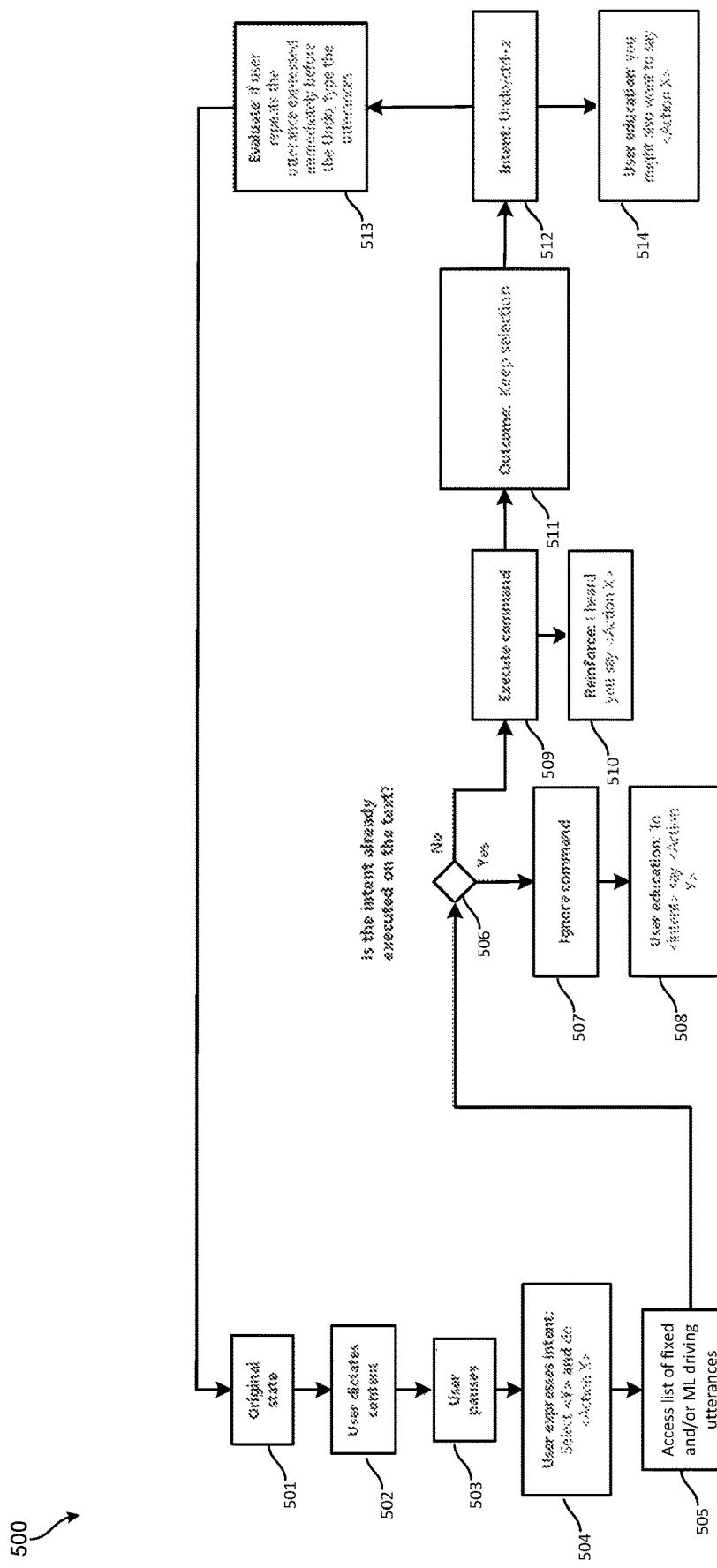
FIG. 5 is a flow diagram of another example process that may be implemented by the contextual language processing unit of FIGS. 1A and 1B.

FIG. 5 is a flow diagram of an example process 500 that may be implemented by the CLPU 110. In the example illustrated in FIG. 5, the command "select the last sentence and bold" is detected in the audio input received from the application 105. The process starts with the application 105 being in an original state 501. The original state may include content, textual or otherwise, that has already added to a document by a current user or another user. In this example, user dictation of textual content is detected in operation 502, and a pause in the user dictation is detected in operation 503. The CLPU 110 may determine, based on the output of the MLLPU 120, that the textual content dictated by the user comprises textual content to be rendered by the application 105. The MLLPU 120 may detect the pause in the audio content at operation 503 and may make a determination that the pause is an indication that the user has completed the dictation of the textual content.

The user may then express an intent to perform a command in operation 504. The command may be uttered in a second utterance after the user pauses at operation 503. As discussed in the preceding examples, operation 503 is optional. The techniques disclosed herein do not require a pause between the textual content dictated by the user in operation 502 and utterance of the command in operation 504. As discussed in the preceding examples, the audio input that includes the spoken content to be processed may include both textual content and one or more commands.

In operation 504, the user expresses the intent to "Select <Y> and do <Action X>." In this example, the value of "<Y>" is the last sentence entered and the value of "<Action X>" is the "bold" command which renders the selected text in a bold font. The MLLPU 120 may determine that the second utterance is a command based on the pause in the user speech, the use of the keyword "select" which the model may be trained to identify as a command. The MLLPU 120 can use this information to infer that the user has expressed an intent to perform a command.

A list of fixed and/or machine learning driven utterances may then be loaded by the MLLPU 120 at operation 505. The MLLPU 120 may use a list of fixed utterance for a particular application or domain. The MLLPU 120 may also access a list of ML driven utterances that were identified by the machine learning model(s) but were not included in the fixed list, such as in the "watermark" example discussed above.

A determination may then be made whether the intent has already been executed on the textual content at operation 506. The command may be ignored at operation 507 if the intent has already been executed on the textual content. The MLLPU 120 and/or the CLPU 110 may then optionally provide user education/assistance based on the intent of the user inferred by the MLLPU 120 based on the textual input provided by the user and the contextual information received from the application 105. Based on the user utterances and the contextual information, the MLLPU 120 may infer that the user was actually intending to issue a command "<Y>" instead of the command that was issued. In this example, the user may have meant to issue the command "select the last sentence" rather than "select the last sentence and bold." Furthermore, the MLLPU 120 inferred that the "last sentence" refers to the previously dictated sentence rather than a last sentence in the document based on the content information provided by the application 105 and the position of the insertion point/cursor at the time that the command was entered.

If the intent has not already been executed on the textual content at operation 506, then the intended operation can be performed at operation 509. As indicated above, the previously dictated sentence is rendered in bold font. The MLLPU 120 may confirm the behavior of the model used was correct to reinforce the behavior of the model in operation 510.

The MLLPU 120 may also keep the cursor/IP at a location where the cursor/IP was located prior to receipt of the command in operation 511. The CLPU 110 may monitor the user interactions with the application 105 at operation 512 to determine whether the user reverts the changes that were made in operation 510, which may indicate that the MLLPU 120 misinterpreted the user intent or that the user misspoke. The user may revert the changes through a set of keystrokes (e.g. pressing the control key+Z) and/or through a series of mouse clicks (e.g. selecting an undo menu item). If the user does not revert the changes, the MLLPU 120 may confirm the behavior of the model used was correct to reinforce the behavior of the model. If the user does revert the changes and the user repeats the utterance made before the undo, then in operation 513 the utterance may be inferred to be textual content rather than a command and the utterance is rendered as textual content on the user interface of the application 105. If the user does revert the changes, the MLLPU 120 may provide a textual and/or audible suggestion that the user might also want to say an alternative command suggested by the MLLPU 120.

Figure 6:
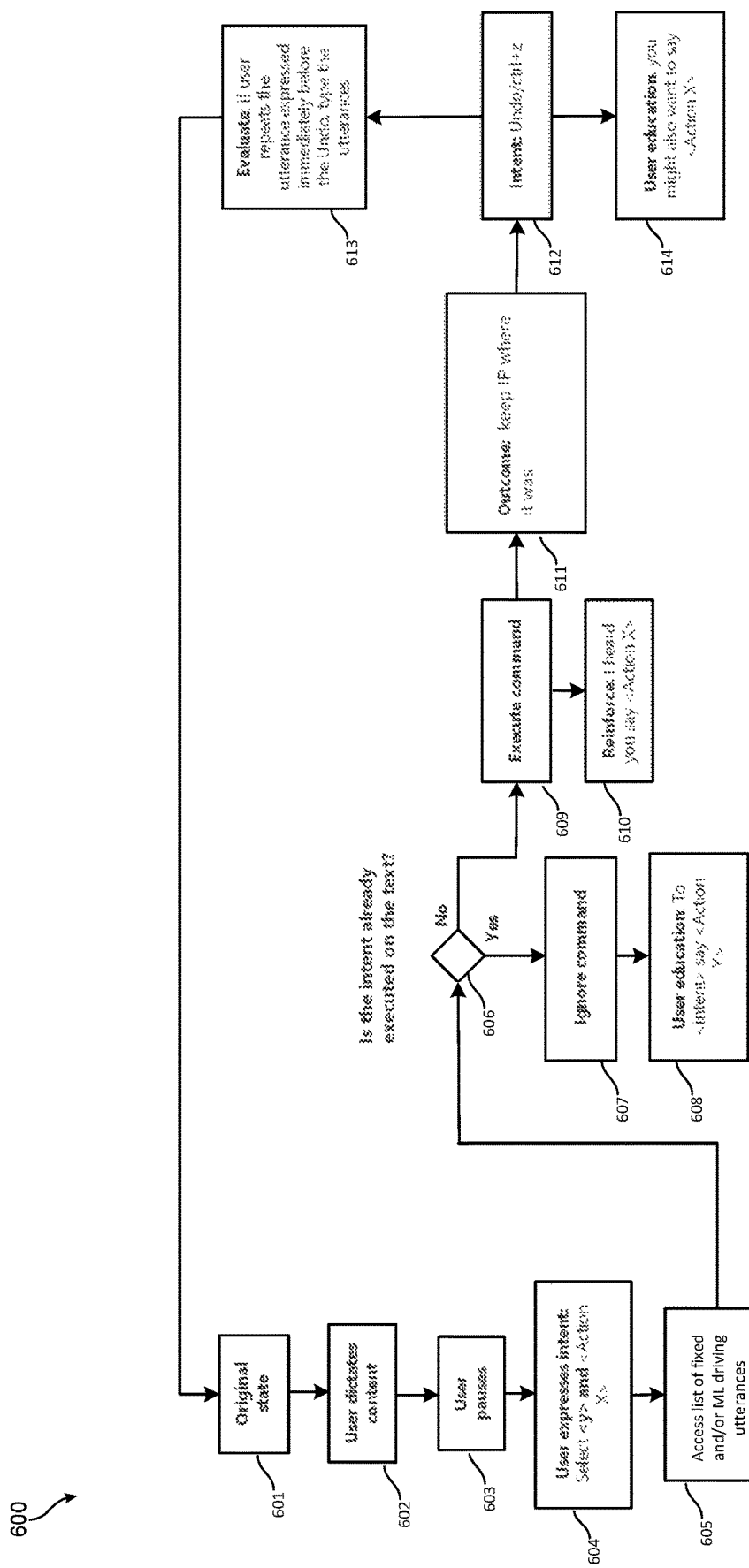
FIG. 6 is a flow diagram of another example process that may be implemented by the contextual language processing unit of FIGS. 1A and 1B.

FIG. 6 illustrates another example process 600 that is similar to the example process 500 of FIG. 5. The process illustrated in FIG. 6 illustrates an example in which the command "bold the last five words" is detected in the audio input received from the application 105. The process starts with the application 105 being in an original state 601. The original state may include content, textual or otherwise, that has already added to a document by a current user or another user. In this example, user dictation of textual content is detected in operation 602, and a pause in the user dictation is detected in operation 603. The CLPU 110 may determine, based on the output of the MLLPU 120, that the textual content dictated by the user comprises textual content to be rendered by the application 105. The MLLPU 120 may detect the pause in the audio content at operation 603 and may make a determination that the pause is an indication that the user has completed the dictation of the textual content.

The user may then express an intent to perform a command in operation 604. The command may be uttered in a second utterance after the user pauses at operation 603. As discussed in the preceding examples, operation 603 is optional. The techniques disclosed herein do not require a pause between the textual content dictated by the user in operation 602 and utterance of the command in operation 604. As discussed in the preceding examples, the audio input that includes the spoken content to be processed may include both textual content and one or more commands.

In operation 604, the user expresses the intent to "Select <Y> and <Action X>." In this example, the value of "<Y>" is the last five words and the value of "<Action X>" is the "bold" command which renders the selected text in a bold font. The MLLPU 120 may determine that the second utterance is a command based on the pause in the user speech, the use of the keyword "bold" which the model may be trained to identify as a command. The MLLPU 120 can use this information to infer that the user has expressed an intent to perform a command.

The example illustrated in FIG. 6 proceeds similarly to the example illustrated in FIG. 5 from this point. Step 606-613 are similar to steps 506-513 illustrated in the example of FIG. 5. In operation 609, the last five words dictated may be rendered in bold font.

Figure 7:
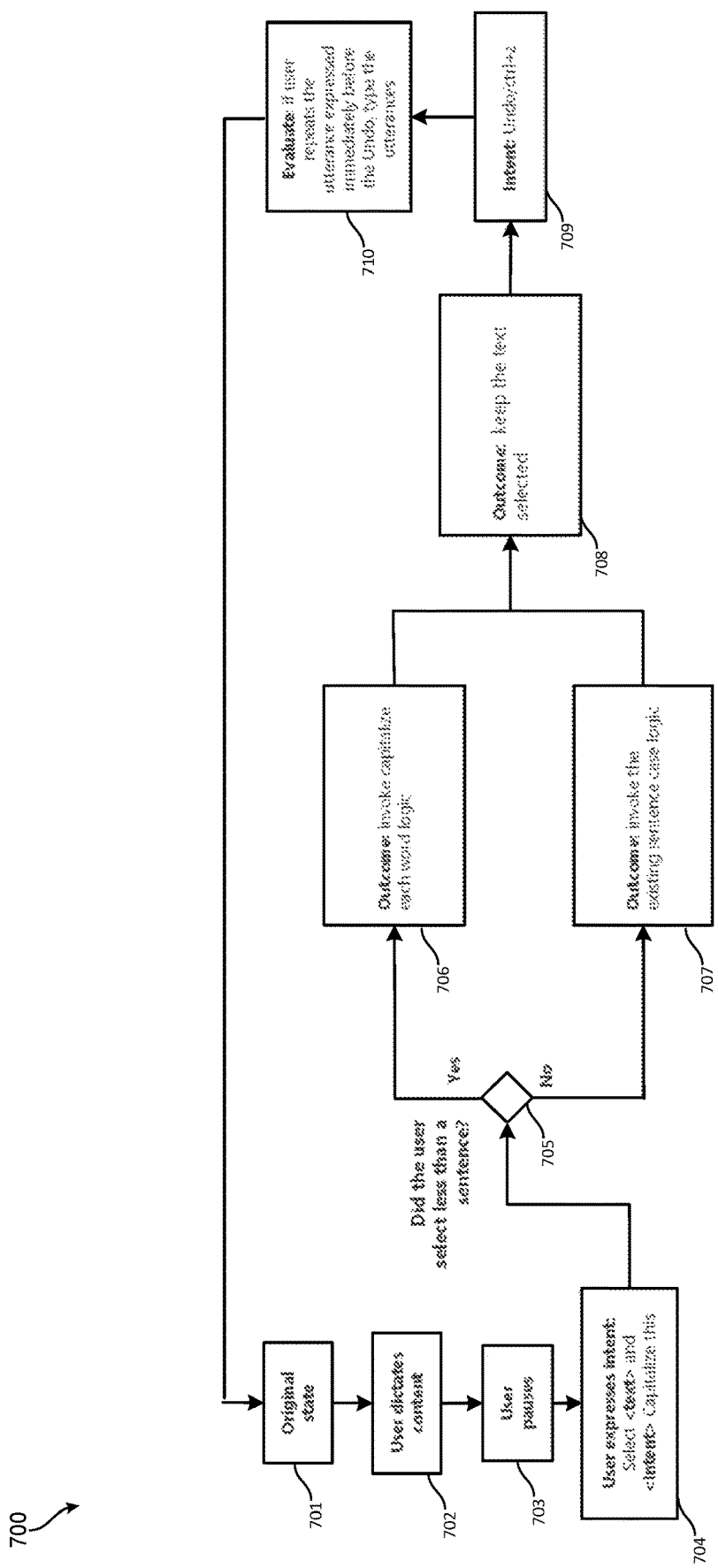
FIG. 7 is a flow diagram of another example process that may be implemented by the contextual language processing unit of FIGS. 1A and 1B.

FIG. 7 illustrates another example process 700 in which a "capitalize" command is detected in the audio input received from the application 105. The process starts with the application 105 being in an original state 701. The original state may include content, textual or otherwise, that has already added to a document by a current user or another user. In this example, user dictation of textual content is detected in operation 702, and a pause in the user dictation is detected in operation 703. The CLPU 110 may determine, based on the output of the MLLPU 120, that the textual content dictated by the user comprises textual content to be rendered by the application 105. The MLLPU 120 may detect the pause in the audio content at operation 703 and may make a determination that the pause is an indication that the user has completed the dictation of the textual content.

The user may then express an intent to perform a command in operation 704. The command may be uttered in a second utterance after the user pauses at operation 703. As discussed in the preceding examples, operation 703 is optional. The techniques disclosed herein do not require a pause between the textual content dictated by the user in operation 702 and utterance of the command in operation 704. As discussed in the preceding examples, the audio input that includes the spoken content to be processed may include both textual content and one or more commands.

In operation 704, the user expresses the intent to "Select <text> and <Intent> Capitalize this." In this example, the value of "<text>" may refer to a subset of the text content that has been dictated, such as a last sentence, this word, or these words, and the use of the "Capitalize" command indicates that the selected text is to be capitalized. The wording of the command may vary depending upon what is being selected. For example, the command may be "capitalize this word," "capitalize this sentence," etc.

In operation 705, a determination can be made whether the user selected less than an entire sentence. If the user did select less than the entire sentence, then in operation 706 logic to capitalize each of the selected words may be invoked. Otherwise, sentence capitalization logic may be invoked to provide proper capitalization based on sentence structure in operation 707. In operation 708, the text may be kept selected after performing either operation 706 or 707 to capitalize the text. The CLPU 110 may monitor the user interactions with the application 105 at operation 709, similar to operation 512 of the process illustrated in FIG. 5, to determine whether the user reverts the changes that were made in operations 706 or 707. If the user does revert the changes and the user repeats the utterance made before the undo, then in operation 710 the utterance may be inferred to be textual content rather than a command and the utterance is rendered as textual content on the user interface of the application 105.

Figure 8:
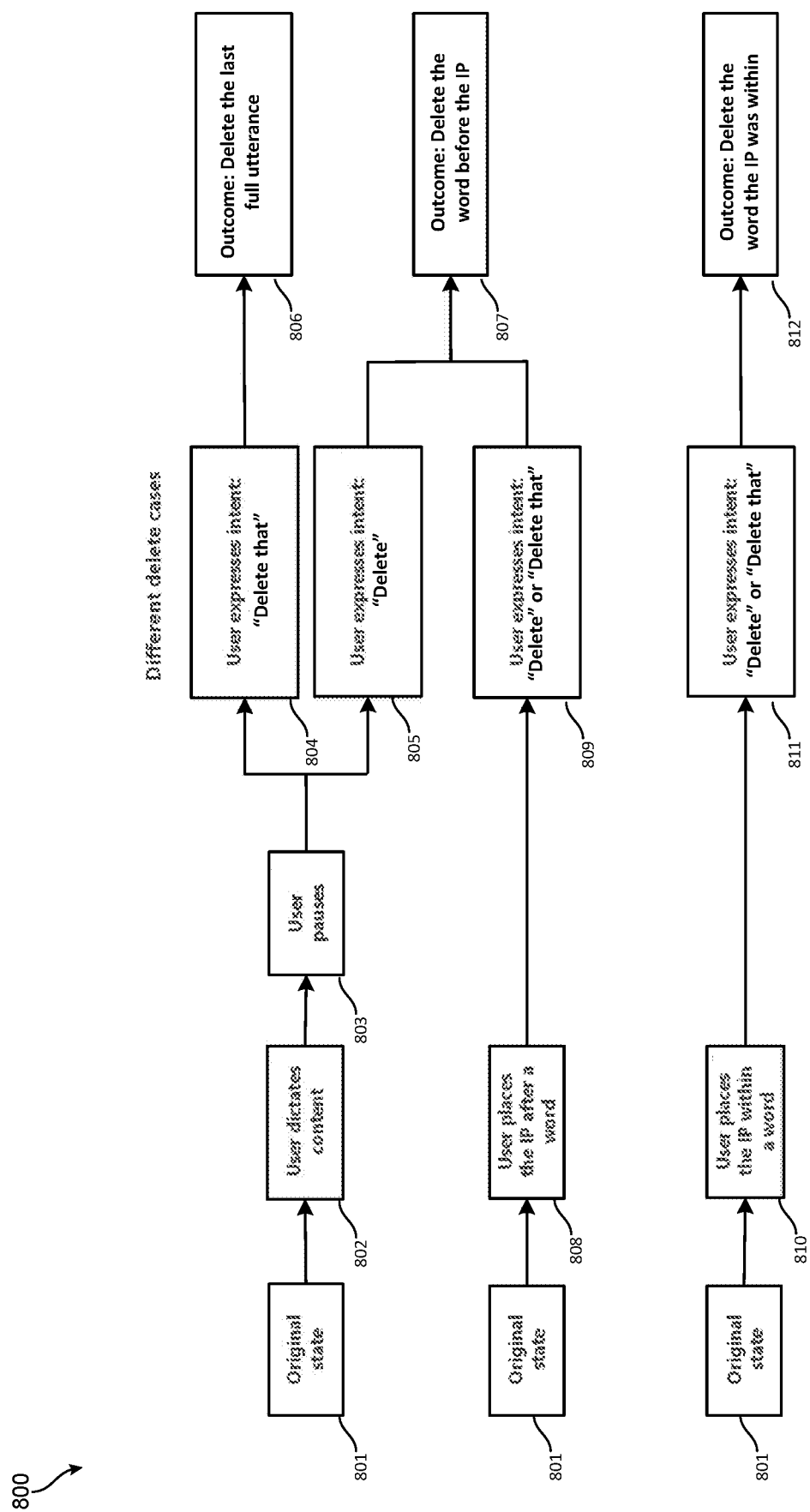
FIG. 8 is a flow diagram of another example process that may be implemented by the contextual language processing unit of FIGS. 1A and 1B.

FIG. 8 illustrates another example process 800 in which a "delete" command is detected in the audio input received from the application 105. The process starts with the application 105 being in an original state 801. The original state may include content, textual or otherwise, that has already added to a document by a current user or another user. In this example, the flow splits depending upon the actions taken by the user.

User dictation of textual content is detected in operation 802, and a pause in the user dictation is detected in operation 803. The CLPU 110 may determine, based on the output of the MLLPU 120, that the textual content dictated by the user comprises textual content to be rendered by the application 105. The MLLPU 120 may detect the pause in the audio content at operation 803 and make a determination that the pause is an indication that the user has completed the dictation of the textual content.

As discussed in the preceding examples, operation 803 is optional. The techniques disclosed herein do not require a pause between the textual content dictated by the user in operation 802 and utterance of the command in operations 804 or 805. As discussed in the preceding examples, the audio input that includes the spoken content to be processed may include both textual content and one or more commands.

The CLPU 110 then detects that the user utters the command "delete" in operation 805 or "delete that" in operation 804. The CLPU 110 determines that the user intended to delete the entire previous utterance in response to operation 804 and provides an indication to the application 105 to delete the word in operation 806. The CLPU 110 determines that the user intended to delete the word before the location of the cursor/IP is located in response to operation 805 and provides an indication to the application 105 to delete the word in operation 807.

In operation 808, a determination is made that the user has placed the cursor/IP after a word in the textual content of the document. The CLPU 110 then detects that the user utters the command "delete" or "delete that" in operation 809. The CLPU 110 determines that the user intended to delete the word before the location of the cursor/IP is located and provides an indication to the application 105 to delete the word in operation 807.

In operation 804, a determination is made that the user has placed the cursor/IP within a word in the textual content of the document. The CLPU 110 then detects that the user utters the command "delete" or "delete that" in operation 811. The CLPU 110 determines that the user intended to delete the word in which the cursor/IP is located and provides an indication to the application 105 to delete the word in operation 812.

Figure 9:
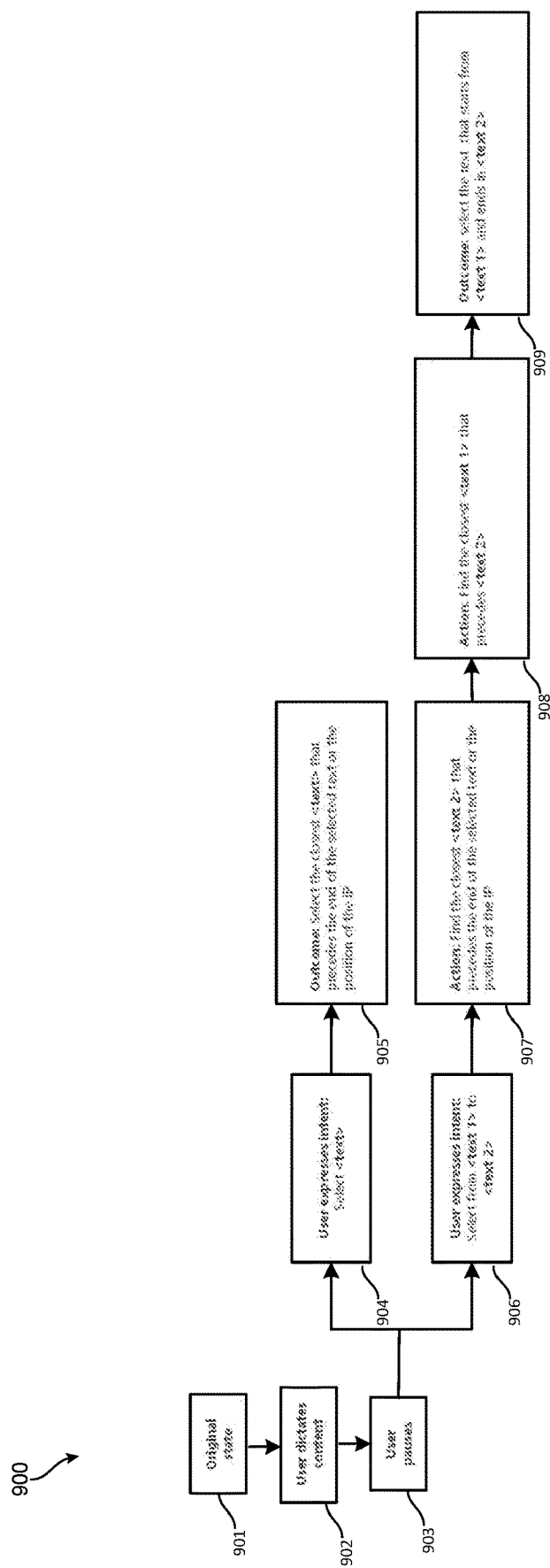
FIG. 9 is a flow diagram of another example process that may be implemented by the contextual language processing unit of FIGS. 1A and 1B.

FIG. 9 illustrates another example process 900 in which a "select" command is detected in the audio input received from the application 105 indicating that the user would like to select a word or a phrase from the text content already dictated or typed into the application 105. The process starts with the application 105 being in an original state in operation 901. In this example, user dictation of textual content is detected in operation 902, and a pause in the user dictation is detected in operation 903. The CLPU 110 may determine, based on the output of the MLLPU 120, that the textual content dictated by the user comprises textual content to be rendered by the application 105. The MLLPU 120 may detect the pause in the audio content at operation 903 and may make a determination that the pause is an indication that the user has completed the dictation of the textual content.

The flow of the process 900 may split after operation 903 in which a pause in the user dictation is detected depending upon the user command detected, and operation 904 or 906 may be performed. As discussed in the preceding examples, operation 903 is optional. The techniques disclosed herein do not require a pause between the textual content dictated by the user in operation 902 and utterance of the command in operations 904 or 906. As discussed in the preceding examples, the audio input that includes the spoken content to be processed may include both textual content and one or more commands.

In operation 904, the command "select <text>" is detected in operation 904, where "<text>" represents word or phrase in the text to be selected. The CLPU 110 determines that the user intended to select the closest instance of the <text> that precedes the current location of the cursor/IP, and the detected instance of the <text> in operation 905.

In operation 906, the command "select <text1> to <text2>" is detected in operation 904, where "<text1>" represents a first word or phrase in the text to be selected and "<text2>" represents and ending word or phrase to be selected. The CLPU 110 the closest instance of the <text2> that precedes the current location of the cursor/IP in operation 907. The CLPU 110 determines that closest instance of the <text1> that precedes the location of <text2> in operation 908. The CLPU 110 then sends an indication to the application 105 that the text from <text1> to <text2> should be selected in operation 909.

FIG. 13 illustrates another example of voice-command chaining that may be implemented by the CLPU 110 of FIGS. 1A and 1B. The CLPU 110 can be configured to take into account the context in which a voice command issued by the user to determine how formatting updates are to be applied to the target text. FIG. 13 illustrates an example of a user issuing the voice command "remove underline and bold." This command could be interpreted in several different ways. One interpretation is that the remove command applies to both underline and bold. Another interpretation is that the remove command applies only to the underline and that bold is separate command to render the text in bold font.

As discussed in the preceding examples, the application can provide contextual information to the CLPU 110 which can be provided to the MLLPU 120 for disambiguating what the user said based on the context of how the command is used and how the user is interacting with the application. The context information can include current cursor/IP location information, previously issued commands, current textual context being rendered by the application, and/or other information that may be indicative of the user's intent. The context can also be determined based on how the text that is the subject of the command is already formatted.

The command "remove text and bold" when applied to text that is both underlined and formatted as in the first example illustrated in FIG. 13, may understood based on the context to remove both the bold and the underlying from the text. Furthermore, the same command may be interpreted different when applied to text that is underlined but not bold as in the second example illustrated in FIG. 13. In the second example, the CLPU 110 and/or the MLLPU 120 may recognize that the text is underlined only and treat the world "bold" as a command. Thus, the underlining is removed from the text and the text is then rendered as bold text. This example is intended to illustrate how the existing formatting of the textual content of the application 105 may be used to provide context as to how a command should be interpreted and the techniques disclosed herein are not limited to this specific example. Other types of formatting related commands may be chained together in an audio input provided by the user and the existing formatting of the text can be used to disambiguate the commands.

Figure 10:
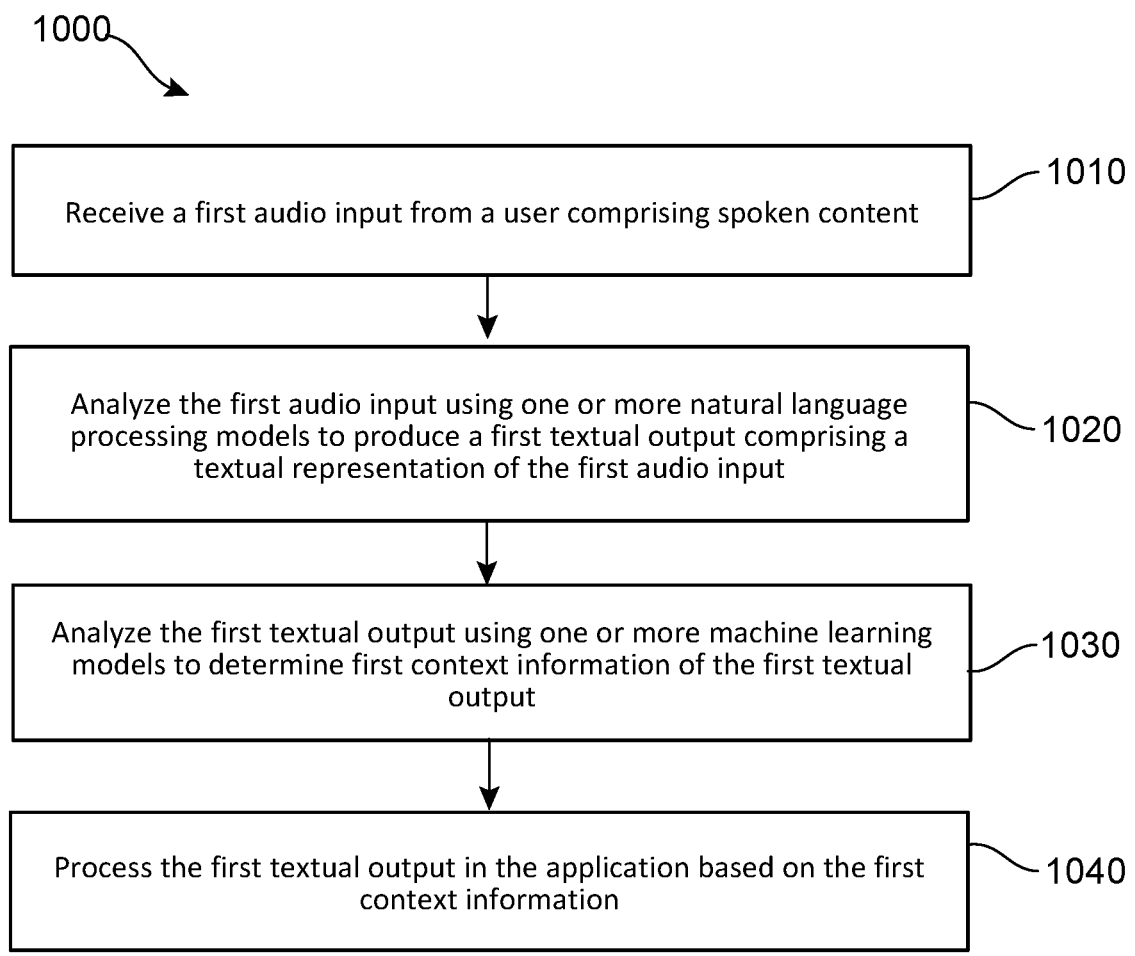
FIG. 10 is a flow chart illustrating an implementation of an example process executed by a data processing system for processing voice content received from a user of the data processing system.

FIG. 10 is a flow chart illustrating an implementation of an example process 1000 executed by a data processing system for processing voice content received from a user. The process 1000 may be implemented by the CLPU 110 illustrated in the preceding examples. The process 1000 may be implemented by a data processing system similar to the data processing system 1200 of FIG. 12.

The process 1000 may include an operation 1010 of receiving a first audio input from a user comprising spoken content. As discussed in the preceding examples, a user may dictate textual content for an application and/or may provide voice commands to be executed by the application. Thus, the spoken content may include a command, textual content, or both.

The process 1000 may include an operation 1020 of analyzing the first audio input using one or more natural language processing models to produce a first textual output comprising a textual representation of the first audio input. The first audio input may be analyzed by one or more natural language processing models of the NPLU 115 to determine a first textual output that represents the textual input and/or commands spoken by the user.

The process 1000 may include an operation 1030 of analyzing the first textual output using one or more machine learning models to determine first context information of the first textual output. The first context information may provide an indication of whether the first textual output includes the command and an indication of how the user intended to apply the command to content in an application as determined by the one or more machine learning models of the MLLPU 120 that analyzed the textual output of the NPLU 115. The contextual information may also include one or more parameters associated with a command included in the first textual output, which can be used by the application 105 to determine how the command is to be applied to the textual content included in the first textual output and/or already received by the application 105. For example, the context information may include in indication of a section of the textual content to which the command is to be applied.

The process 1000 may include an operation 1040 of processing the first textual output in the application based on the first context information. The application 105 may receive the first textual input and the first context information from the CLPU 110. The application 105 use the first context information to determine whether the first textual output includes textual content to be rendered by the application 105 and/or one or more commands to be executed by the application 105. The one or more commands may include one or more parameters for the commands. The one or more commands may also be executed on textual content that is included in the first textual output and/or on other textual content that has already been received by the application 105 from the same or another user.

The detailed examples of systems, devices, and techniques described in connection with FIGS. 1-10 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 11:
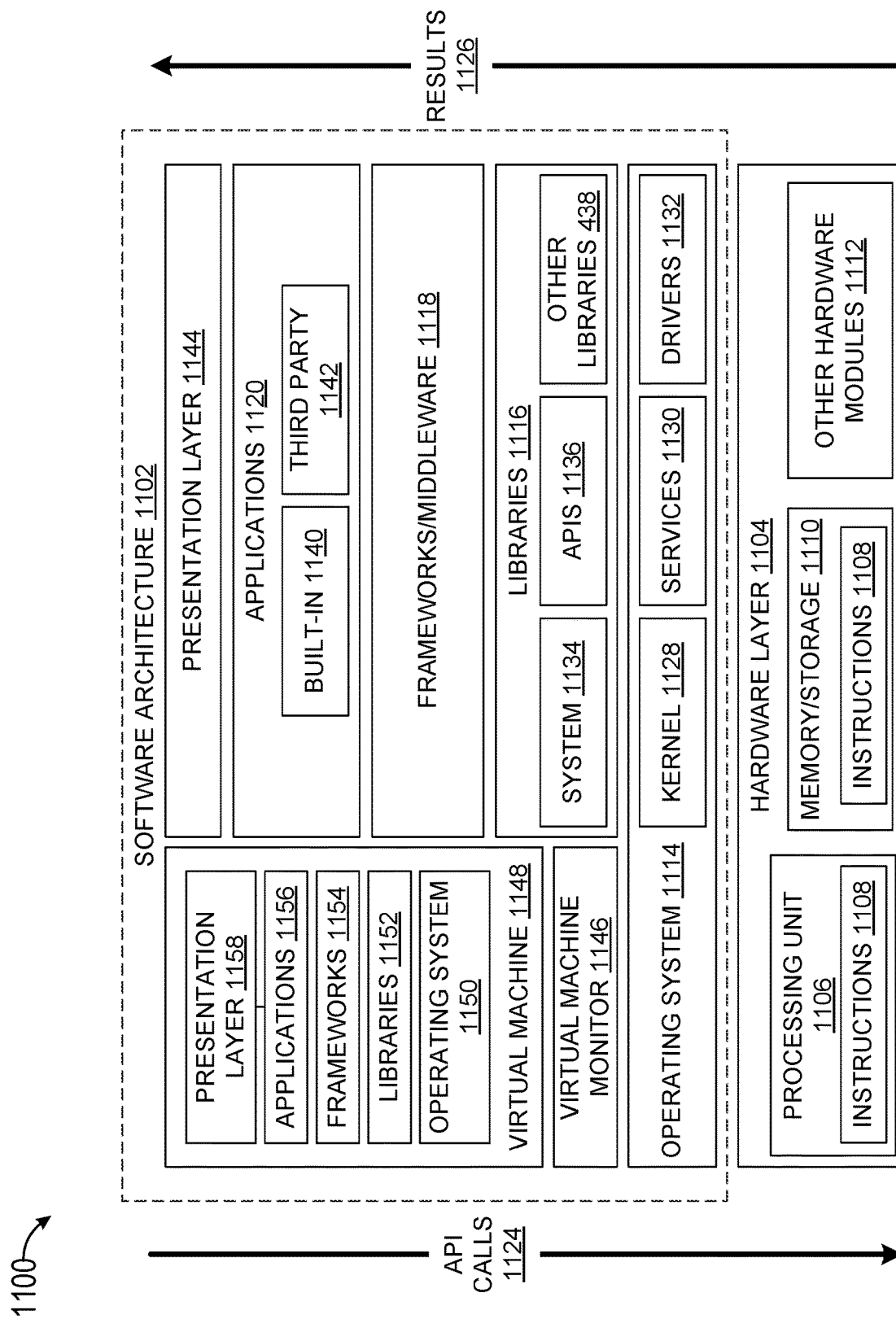
FIG. 11 is a block diagram illustrating an example software architecture, various portions of which may be used in conjunction with various hardware architectures herein described, which may implement any of the features herein described.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as a machine 1200 of FIG. 12 that includes, among other things, processors 1210, memory 1230, and input/output (I/O) components 1250. A representative hardware layer 1104 is illustrated and can represent, for example, the machine 1200 of FIG. 12. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1144. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1140 and/or third-party applications 1142. Examples of built-in applications 1140 may include, but are not limited to, a contacts application, a browser application, a location application, a media application, a messaging application, and/or a game application. Third-party applications 1142 may include any applications developed by an entity other than the vendor of the particular platform. The applications 1120 may use functions available via OS 1114, libraries 1116, frameworks 1118, and presentation layer 1144 to create user interfaces to interact with users.

Some software architectures use virtual machines, as illustrated by a virtual machine 1148. The virtual machine 1148 provides an execution environment where applications/modules can execute as if they were executing on a hardware machine (such as the machine 1200 of FIG. 12, for example). The virtual machine 1148 may be hosted by a host OS (for example, OS 1114) or hypervisor, and may have a virtual machine monitor 1146 which manages operation of the virtual machine 1148 and interoperation with the host operating system. A software architecture, which may be different from software architecture 1102 outside of the virtual machine, executes within the virtual machine 1148 such as an OS 1114, libraries 1172, frameworks 1154, applications 1156, and/or a presentation layer 1158.

Figure 12:
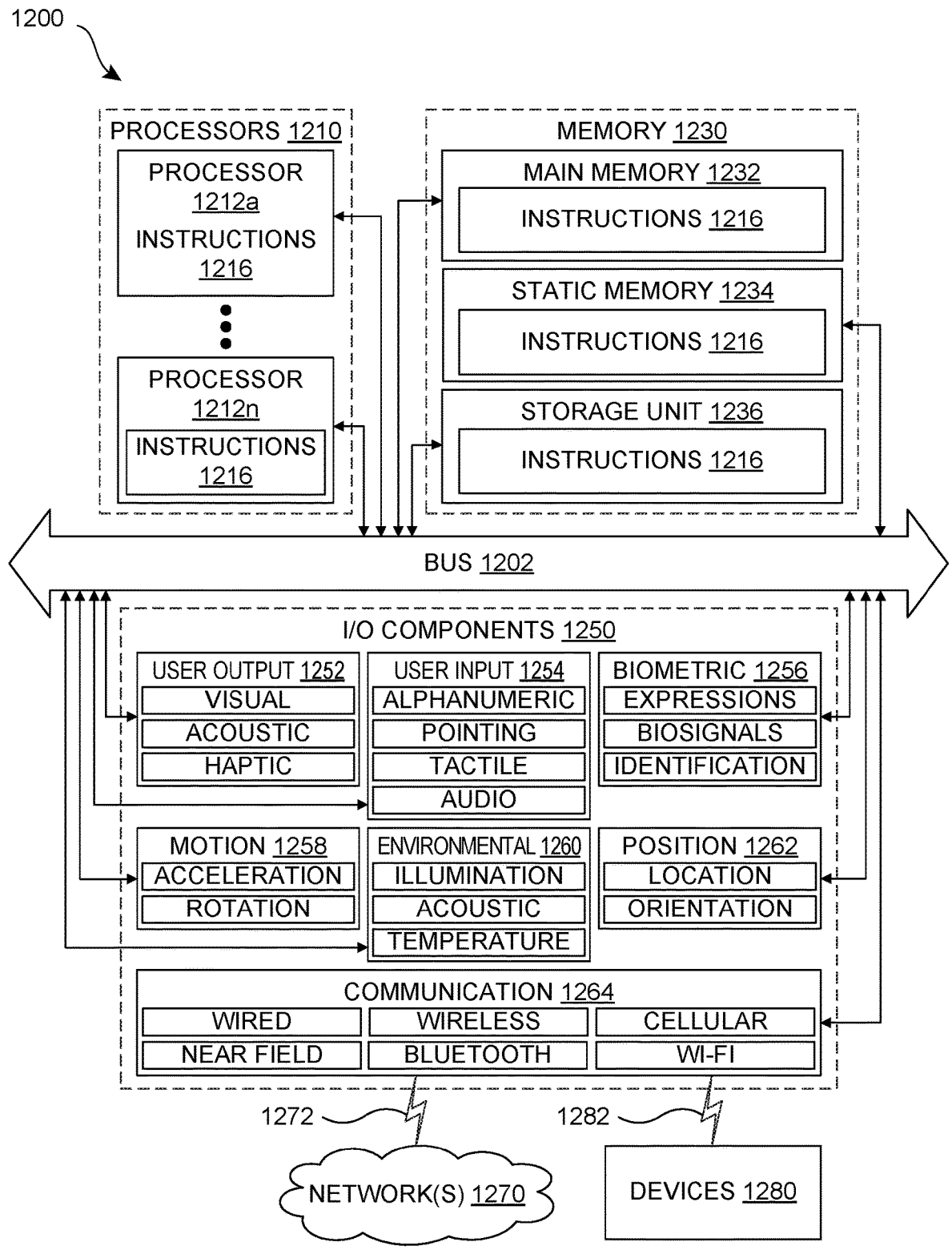
FIG. 12 is a block diagram illustrating components of an example machine configured to read instructions from a machine-readable medium and perform any of the features described herein.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" includes a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256, motion components 1258, environmental components 1260, and/or position components 1262, among a wide array of other physical sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1258 may include, for example, acceleration sensors (for example, an accelerometer) and rotation sensors (for example, a gyroscope). The environmental components 1260 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network(s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations of:
   receiving a first audio input from a user comprising spoken content;
   analyzing the first audio input using one or more natural language processing models to produce a first textual output comprising a textual representation of the first audio input;
   analyzing the first textual output using one or more machine learning models to determine first context information of the first textual output, wherein the first context information identifies a type of application being used by the user and includes information indicative of how the user was interacting with the application when the first audio input was received; and
   processing the first textual output in the application based on the first context information.

2. The data processing system of claim 1, wherein the spoken content comprises a command, textual content, or both; and wherein the first context information of the first textual output provides an indication of whether the first textual output includes the command and an indication of how the user intended to apply the command to content in the application.

3. The data processing system of claim 2, wherein the instructions to process the first textual output in the application based on the first context information further include instructions configured to cause the processor to perform operations of rendering first textual content to a document in the application responsive to the first context information indicating that the first textual output includes the textual content.

4. The data processing system of claim 2, wherein the instructions to process the first textual output in the application based on the first context information further include instructions configured to cause the processor to perform operations of executing a command on the contents of a document in the application responsive to the first context information indicating that the first textual output includes the command.

5. The data processing system of claim 1, wherein the instructions to analyze the first textual output further include instructions configured to cause the processor to perform an operation of disambiguating between textual input and command input included in the first textual output based on the output of the one or more machine learning models.

6. The data processing system of claim 1, further including instructions configured to cause the processor to perform operations of:
   receiving usage information from the application indicative of user interactions with the application prior to receiving the first audio input, while receiving the first audio input, or after receiving the first audio input; and
   wherein analyzing the first textual output further comprises analyzing the first textual output and the application usage information using one or more machine learning models to determine the first context information of the first textual output.

7. The data processing system of claim 6, wherein the instructions to analyze the first textual output further include instructions configured to cause the processor to perform operations of:
   disambiguating command scope based on the usage information from the application.

8. A method performed by a data processing system for processing voice content received from a user, the method comprising:

receiving a first audio input from a user comprising spoken content;

analyzing the first audio input using one or more natural language processing models to produce a first textual output comprising a textual representation of the first audio input;

analyzing the first textual output using one or more machine learning models to determine first context information of the first textual output, wherein the first context information identifies a type of application being used by the user and includes information indicative of how the user was interacting with the application when the first audio input was received; and processing the first textual output in the application based on the first context information.

9. The method of claim 8, wherein the spoken content comprises a command, textual content, or both, and wherein the first context information of the first textual output provides an indication of whether the first textual output includes the command and an indication of how the user intended to apply the command to content in the application.

10. The method of claim 9, wherein processing the first textual output in the application based on the first context information further comprises:

rendering first textual content to a document in the application responsive to the first context information indicating that the first textual output includes the textual content.

11. The method of claim 9, wherein processing the first textual output in the application based on the first context information further comprises:

executing a command on the contents of a document in the application responsive to the first context information indicating that the first textual output includes the command.

12. The method of claim 8, wherein analyzing the first textual output using one or more machine learning models to determine the first context information of the first textual output further comprises:

disambiguating between textual input and command input included in the first textual output based on the output of the one or more machine learning models.

13. The method of claim 8, further comprising:

receiving usage information from the application indicative of user interactions with the application prior to receiving the first audio input, while receiving the first audio input, or after receiving the first audio input; and wherein analyzing the first textual output further comprises analyzing the first textual output and the application usage information using one or more machine learning models to determine the first context information of the first textual output.

14. The method of claim 13, wherein analyzing the first textual output using one or more machine learning models to determine the first context information of the first textual output further comprises:

disambiguating command scope based on the usage information from the application.

15. A memory device storing instructions that, when executed on a processor of a data processing system, cause the data processing system to process voice content received from a user, by:

receiving a first audio input from a user comprising spoken content;

analyzing the first audio input using one or more natural language processing models to produce a first textual output comprising a textual representation of the first audio input;

analyzing the first textual output using one or more machine learning models to determine first context information of the first textual output, wherein the first context information identifies a type of application being used by the user and includes information indicative of how the user was interacting with the application when the first audio input was received; and processing the first textual output in the application based on the first context information.

16. The memory device of claim 15, wherein the spoken content comprises a command, textual content, or both; and wherein the first context information of the first textual output provides an indication of whether the first textual output includes the command and an indication of how the user intended to apply the command to content in the application.

17. The memory device of claim 16, wherein the instructions to process the first textual output in the application based on the first context information further include instructions configured to cause the processor to perform operations of rendering first textual content to a document in the application responsive to the first context information indicating that the first textual output includes the textual content.

18. The memory device of claim 16, wherein the instructions to process the first textual output in the application based on the first context information further include instructions configured to cause the processor to perform operations of executing a command on the contents of a document in the application responsive to the first context information indicating that the first textual output includes the command.

19. The memory device of claim 15, wherein the instructions to analyze the first textual output using one or more machine learning models to determine the first context information of the first textual output further include instructions configured to cause the processor to perform operations of disambiguating between textual input and command input included in the first textual output based on the output of the one or more machine learning models.

20. The memory device of claim 15, further including instructions configured to cause the processor to perform operations of:

receiving usage information from the application indicative of user interactions with the application prior to receiving the first audio input, while receiving the first audio input, or after receiving the first audio input; and wherein the instructions configured to cause the processor to analyze the first textual output further include instructions to cause the processor to perform the operations of analyzing the first textual output and the application usage information using one or more machine learning models to determine the first context information of the first textual output.

* * * * *